United States Patent Office 3,261,663
Patented July 19, 1966

3,261,663
METHOD OF PREPARING TITANIUM TRICHLORIDE
Abram Aronovich Foorman, 1st Jaroslavskaja, 21–a, korpus 24, Apt. 35, and Victorija Borisovna Lavrova, Maly Levshinsky Bystreet, 6–8, Apt. 37, both of Moscow, U.S.S.R.
No Drawing. Filed July 18, 1963, Ser. No. 296,118
4 Claims. (Cl. 23—87)

The present invention relates to an industrial method of producing titanium trichloride, which is used, for example, as a catalyst in the polymerization of olefins, propylene in particular.

It is known that titanium trichloride is produced from titanium tetrachloride by reduction of the latter with hydrogen. However, this method has a significance only for laboratory use and is not fit for application in industry, as the rate of the reaction is very low and large volumes of hydrogen are required. The hydrogen must be thoroughly cleaned of oxygen, moisture, hydrogen chloride and other admixtures, which makes this method still more complicated.

Other methods are also known wherein aluminium, sodium, antimony or titanium are employed for the reduction of titanium tetrachloride to titanium trichloride.

All these methods also have shortcomings, as upon the reduction of titanium tetrachloride with aluminium, sodium or antimony, mixtures of titanium trichloride with the chloride of the metal used are formed, the separation of which involves considerable difficulties.

The difficulties involved in separating such mixtures are avoided when using metallic titanium for the reduction of titanium tetrachloride. However, this method also has a shortcoming which consists in the titanium tetrachloride being reduced to a greater degree with titanium dichloride being formed together with the titanium trichloride; the dichloride coats the metallic titanium and stops the reaction. Furthermore, this method is very expensive due to the high cost of the titanium.

The direct use of an unseparated mixture of titanium trichloride with aluminium chloride or sodium chloride as the catalyst for the polymerization of olefins has been proposed. Although in some instances the polymerization process proper proceeded satisfactorily; however, additional troublesome operations were required to wash away the admixtures from the polymer. The process is especially complicated when a mixture of titanium trichloride with sodium chloride is used as the catalyst, due to the weak solubility of the latter in alcohol.

Thus, attempts to overcome the above difficulties and shortcomings have not given positive results; this problem has been solved by us, and the solution has been realized in practice.

It is now established that if the reduction of titanium tetrachloride is carried out with silicon, the reaction products, i.e., the titanium trichloride and silicon chloride can be separated quite easily. It has also been established that at a high temperature silicon reduces titanium tetrachloride to titanium trichloride almost exclusively. Under certain operating conditions highly dispersed titanium trichloride is obtained.

An aim of the present invention is the creation of a simple and economical method for the preparation of titanium trichloride.

A second aim of this invention is the creation of a production method ensuring quite simple separation of the reaction products.

Another aim of this invention is the development of a production method for the preparation of highly dispersed titanium trichloride.

These aims are reached in the invention by reducing the titanium tetrachloride with silicon which upon combining with the chlorine forms at high temperatures a volatile compound, viz. silicon tetrachloride. The titanium tetrachloride may also be reduced with another metal forming a volatile chloride, e.g., boron.

It is established that titanium tetrachloride is readily reduced with silicon at a temperature of 700 to 1100° C. In this instance the silicon reduces the titanium tetrachloride almost exclusively to titanium trichloride.

The titanium trichloride and silicon tetrachloride formed in the reducing zone as well as the excessive titanium tetrachloride pass in the form of vapours into the condensation zone, where the temperature is maintained above the boiling points of the titanium and silicon tetrachlorides. Due to such conditions the titanium trichloride condenses, while the vapours of the titanium and silicon tetrachlorides are delivered to coolers and then separated by distillation. The titanium tetrachloride is returned for processing, while the silicon tetrachloride is recovered as a marketable product.

The cost of titanium is about ten times that of silicon, while the demand for silicon according to the reaction $$4TiCl_4 + Si = 4TiCl_3 + SiCl_4$$

is almost two times less than that for titanium. Besides this such a useful and scarce material as silicon tetrachloride is obtained as a by-product. From this point of view the present invention can be considered as a method for the simultaneous production of titanium trichloride and silicon tetrachloride.

The use of silicon as the reducer simplifies the selection of a design for an industrial reactor. A low consumption of silicon (about 50 kg. per ton of finished product) requires heating of a small reaction zone.

If the reaction products are condensed together in the condensation zone at a temperature of 20 to 30° C., a suspension is formed from which the volatile chlorides are separated in some way or other, highly dispersed titanium trichloride being obtained.

The following examples are intended as an illustration of the invention to make it more clear to competent people.

Example 1

Titanium tetrachloride vapour was passed through a bed of silicon metal 10 mm. high at a temperature of 900° C. for 2 hours. The total amount of titanium tetrachloride vaporized was 345 grams.

In the condensation zone a temperature of 250° C. was maintained. 54 grams of the finished product were obtained having the following composition:

| | Percent |
|---|---|
| Titanium trichloride | 94.3 |
| Titanium tetrachloride | 3.2 |
| Titanium dichloride | 1.2 |
| Metallic titanium | 0.7 |

Example 2

Titanium tetrachloride vapor was passed through a bed of silicon metal 20 mm. high at a temperature of 900° C. for 2 hours. The total amount of titanium tetrachloride vaporized was 470 grams. A temperature of 30° C. was maintained in the condensation zone. The solid phase was then separated from the suspension obtained by filtration in an inert atmosphere with subsequent washing of the titanium trichloride with gasoline. After drying 65 grams of the product were obtained having the following composition:

| | Percent |
|---|---|
| Titanium trichloride | 98.8 |
| Titanium tetrachloride | 0.5 |
| Titanium dichloride | 0.2 |
| Metallic titanium | 0.2 |

The proposed method was tested by us in an experimental installation with an output of 10 to 15 kg. of titanium trichloride per day.

What we claim is:

1. A method for the preparation of $TiCl_3$ from $TiCl_4$ and Si which comprises:

bringing $TiCl_4$ into contact with solid Si in a reaction zone at a temperature above 700° C. thereby forming a vapor mixture containing $TiCl_3$ and $SiCl_4$ produced as a result of the reaction between Si and $TiCl_4$;

condensing the $TiCl_3$ from said vapor mixture at a temperature above the boiling point of $TiCl_4$ and the boiling point of $SiCl_4$;

and recovering the $TiCl_3$, so produced.

2. The method of claim 1 in which the $TiCl_3$ is condensed at a temperature between 200° and 300° C.

3. The method of claim 1 in which the reaction zone is maintained at a temperature between 700° C. and 1100° C.

4. The method of claim 1 in which both the $SiCl_4$ and $TiCl_3$ are separately recovered from the mixture formed in the reaction zone.

References Cited by the Examiner

UNITED STATES PATENTS 2,993,009   7/1961   Bown et al. _____ 23—87 XR
3,001,951   9/1961   Tornquist et al.

OTHER REFERENCES

Chem. Abstracts, vol. 53, No. 15, August 1959, p. 14438.

Hampel's book, "Encyclopedia of Chem. Reactions" (Jacobson), vol. 6, 1956 Ed., pp. 90, 97, Reinhold Pub. Corp., New York.

OSCAR R. VERTIZ, *Primary Examiner.*

MAURICE A. BRINDISI, *Examiner.*

E. STERN, *Assistant Examiner.*